March 27, 1934.    R. STAHL    1,952,147
VALVE STRUCTURE
Filed April 26, 1930    2 Sheets-Sheet 1
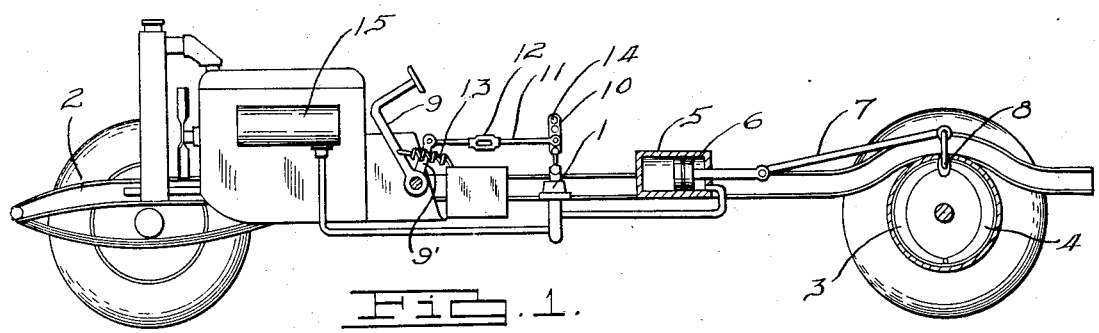
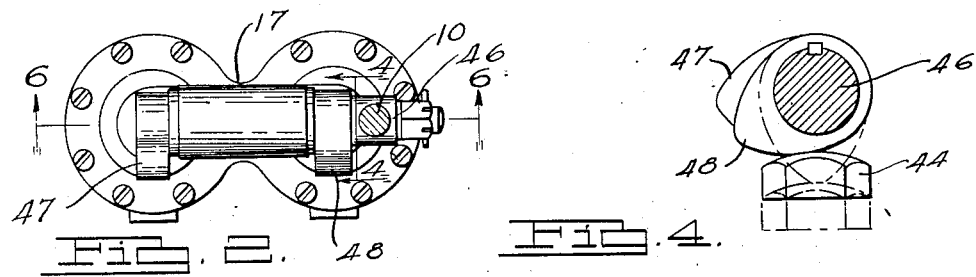
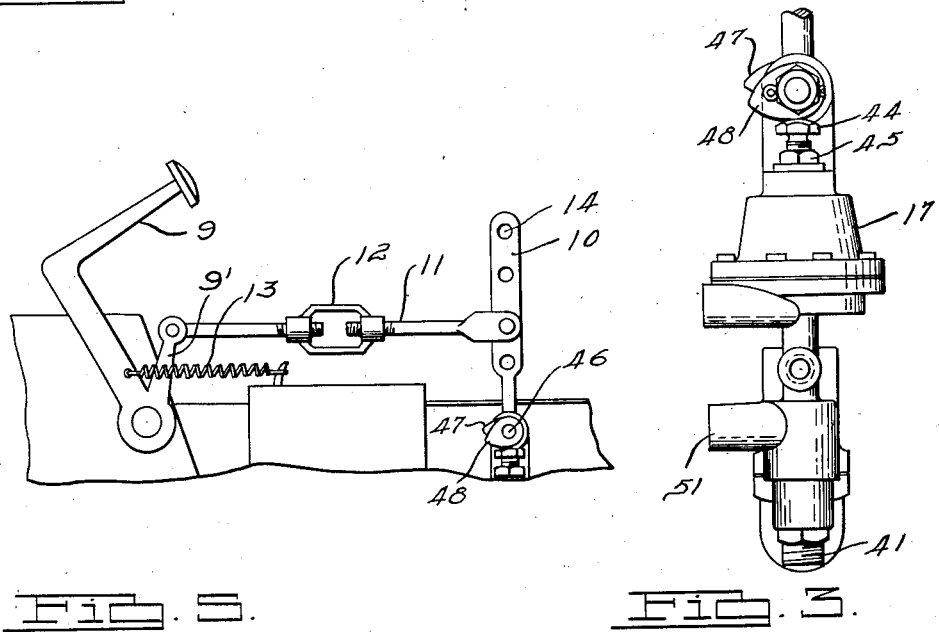
INVENTOR
RODOLPHE STAHL
BY
ATTORNEYS March 27, 1934.  R. STAHL  1,952,147
VALVE STRUCTURE
Filed April 26, 1930  2 Sheets-Sheet 2
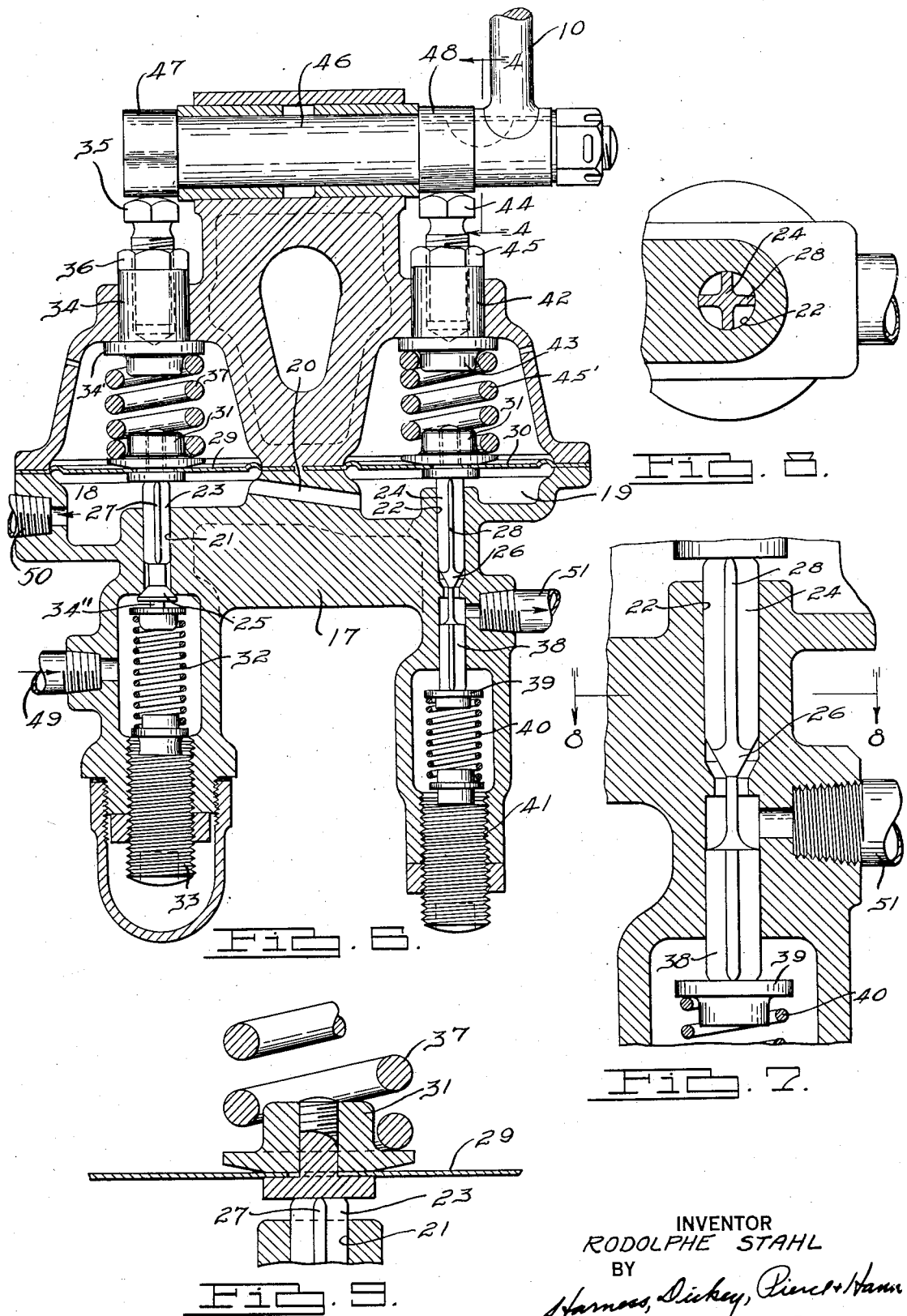
INVENTOR
RODOLPHE STAHL
BY
Harness, Dickey, Pierce & Hamm
ATTORNEYS.

Patented Mar. 27, 1934

1,952,147

UNITED STATES PATENT OFFICE 1,952,147

VALVE STRUCTURE

Rodolphe Stahl, Detroit, Mich.

Application April 26, 1930, Serial No. 447,706

8 Claims. (Cl. 303—54)

This invention relates to valve structure, particularly for air-braking systems of motor vehicles.

The main objects of this invention are to provide improved valve actuating apparatus, by which the pressure of a fluid pressure brake cylinder may be variably regulated; to provide means of this kind which may be manually operated, so as to gradually apply and gradually slack off the brakes of a vehicle; to provide control apparatus for an air-braking system which is operable by a vehicle brake pedal of conventional constructions; and to provide means for adjusting such control apparatus so as to adapt the braking system for vehicles of different weights.

Further objects of this invention are to provide an improved manually operable valve structure which is automatically controlled so as to maintain a selected pressure of a wide range of pre-determined pressures; to provide valve structure of this kind which will gradually vary the pressure of a pneumatic system; to provide individual regulating units for the inlet and exhaust valves respectively, of a pneumatic system, which are both controlled by the same air pressure; to provide a pair of adjusting members in each regulating unit by which a wide range of adjustment may be made in each unit independently; and to provide adjusting means of this kind by which either the inlet valve or the outlet valve may be conditioned to independently regulate the pressure of the system, and to jointly regulate said pressure.

An illustrative embodiment of my invention is shown in the accompanying drawings, in which:

Figure 1 is a side elevation, partly in section, of a vehicle chassis embodying my invention.

Figure 2 is a top plan view of a pressure regulating device.

Figure 3 is a side elevation of the device shown in Figure 2.

Figure 4 is an enlarged vertical section taken on line 4—4 of Figure 2 showing parts of the regulating device in a changed position.

Figure 5 is an enlarged fragmentary side elevation of the chassis, showing control structure for the pressure regulating device.

Figure 6 is a central vertical section taken on the line 6—6 of Figure 2.

Figure 7 is an enlarged section of the valve structure taken in the plane of the section shown in Figure 6.

Figure 8 is a horizontal section taken on the line 8—8 of Figure 7.

Figure 9 is an enlarged vertical fragmentary section taken centrally through portions of a valve stem and actuating means therefor, illustrated in Fig. 6.

In the form shown, my improved valve structure 1 is illustrated in connection with a fluid pressure braking system of a vehicle chassis, which comprises a frame 2, having brake shoes 3 and 4, pivotally mounted thereon, a cylinder 5 having a piston 6 therein which is mechanically connected by a link 7 with brake shoe-operating mechanism 8, and a brake pedal 9. The brake pedal 9 has an integral arm 9' which is connected with a valve operating lever 10 by a link 11, having an adjustable turnbuckle 12. The pedal 9 is normally rotated to the right, as viewed in Figure 1, by a spring 13. Formed in the valve operating lever 10 are spaced apertures 14 by which the link 11 may be selectively attached to the lever 10 at various positions. Located on the side of the cylinder block of the chassis is a fluid pressure reservoir 15 which may be charged by a compressor or the like, not shown in the drawings, having an operative connection with the motor.

The valve structure 1 which is illustrated in detail in Figure 6 comprises a casing 17, having air passages 18 and 19 therein, which communicate with each other through a passage 20. Slidably mounted in constricted portions 21 and 22 of the passages 18 and 19 respectively, are valve stems 23 and 24, which carry an inlet valve 25 and an outlet exhaust valve 26 respectively. Formed on the valve stems 23 and 24 are radial guide flanges 27 and 28, by means of which the valve stems are spaced from the wall of the passages 21 and 22, so as to provide communication between the upper and lower portions of the passages 18 and 19.

The upper extremity of the valve stems 23 and 24 have threaded portions which extend through apertures in pressure sensitive diaphragms 29 and 30 respectively. The threaded portions of the valve stems are provided with threaded caps 31, for firmly securing the stems to the diaphragm.

The inlet valve 25 is normally held in a closed position by a coil spring 32 which bears between a threaded adjustable member 33 and a projection 34'' on the valve. Slidably mounted in the valve casing 17 in axial alignment with the valve stem 23 is a plug 34 which has an enlarged lower extremity 34' and an adjusting bolt 35 which may be firmly secured in a selected position by a lock nut 36. Bearing between the enlarged extremity 34' and the cap 31 is a coil spring 37 which normally urges the valve 25 to an open position.

A tappet 38 is slidably mounted in the lower end portion of the passage 22 in registration with the exhaust valve 26. The tappet 38 rests upon a seat 39 on the upper end of the coil spring 40 which is supported by an adjustable threaded member 41. The spring 40 and tappet 38 normally hold the exhaust valve 26 in an open position, as shown in Figure 6. Slidably mounted in the casing 17 in axial alignment with the exhaust valve 26 is a plug 42, which has an enlarged extremity 43 at its inner lower end, and an adjusting bolt 44 threaded in its upper end which may be securely held in a selected position by a lock nut 45. A spring 45' bears between extremity 43 and the caps 31 and normally urges the exhaust valve 26 to a closed position.

Journaled in the upper portion of the casing 17 is a cam shaft 46 on which the valve operating lever 10 of the manual control mechanism is rigidly connected. The cam shaft 46 has spaced cams 47 and 48 which register respectively with the tops of the adjusting bolts 35 and 44. The crest of the cam 48 is located slightly in advance of the crest of the cam 47 for urging the plug 42 downwardly so as to close the exhaust valve 26 before the plug 34 is urged downwardly to open the inlet valve 25 when the cam shaft 46 is rotated in a counter-clockwise direction, as shown in Figure 4.

In operation, fluid under pressure such as compressed air, is admitted through the inlet 49 into the lower portion of the passage 18 in the left side of the valve casing 17. When the brake pedal 9 is pressed inwardly, the cam shaft 46 is rotated in a counter-clockwise direction, as viewed in Figure 4, and the plugs 34 and 42 are moved inwardly with respect to the casing. The plug 42 compresses the spring 45' which urges the valve 26 downwardly to a closed position. Slight further rotation of the cam shaft 46 causes the cam 47 to urge the plug 34 downwardly so as to compress the spring 37. The spring 37 urges the inlet valve 25 to an open position, admitting air under pressure from the lower portion to the upper portion of the passage 18. As the pressure below the diaphragm 29 is built up by the admission of air, the diaphragm is deflected upwardly and the valve 25 is closed when a pre-determined pressure is obtained. Further counter-clockwise movement of the cam shaft 46 augments the compression of the spring 37, and urges the inlet valve 25 downwardly. The pressure below the diaphragm 29 is then built up to an intensity which corresponds with the particular setting of the cam 47.

The space below the diaphragm 29 communicates through an outlet pipe 50 with the air cylinder 5 of the braking system, admitting compressed air into the cylinder and moving the piston 6 to the right as viewed in Figure 1. This movement of the piston 6 applies the brake shoes 3 and 4 to the drums with which they are associated. By providing the cam 47 with gradually increasing radii, it is possible to produce any pressure in the cylinder of a substantially large range of pressure, and to gradually increase the pressure in the cylinders from one intensity to another.

The pedal 9 is rotated in a clockwise direction by the spring 13 when the pedal is released, and this rotation of the pedal causes the cam shaft 46 to rotate in a clockwise direction as viewed in Figure 4, reducing the compression of the spring 37 so as to allow the spring 32 to close the inlet valve 25. The clockwise rotation of the cam 48 reduces the compression of the spring 45', allowing the spring 40 to move the exhaust valve 26 to an open position. Opening of the exhaust valve 26 allows the air in the passages 18 and 19 to escape through an exhaust outlet 51.

Escapement of pressure from the interior of the valve structure reduces the pressure in the cylinders 5, allowing the brake shoes to be retracted from the drum by conventional resilient mechanism, not shown in the drawings. Escapement of air by the exhaust valve 26 is controlled by the diaphragm 30, which assists the spring 40 in opening the exhaust valve. As the pressure in the passage 19 below the diaphragm 30 increases, the valve opening effect of the diaphragm 30 is reduced. When the combined force of the spring 40 and the diaphragm 30 is less than the compression of the spring 45', the valve 26 will close. The compression of the spring 45' however may be varied by rotation of the cam 48. The gradually increasing radii of the cam 48 permits the compression of the spring 45' to be gradually varied throughout a substantially wide range, thereby controlling the escapement of pressure from the interior of the valve structure. In this manner, the pressure in the brake cylinder 5 is gradually reduced so as to gradually slack off the brake shoes.

The initial compression of the springs 37 and 32 of the inlet valve 25 may be varied by the adjusting members 35 and 33, respectively, and the initial compression of the springs 45' and 40 of the exhaust valve 26 may be varied by the adjusting members 44 and 41, respectively. Each valve regulating unit is thus provided with a pair of adjusting members by which a wide range of adjustments may be made in each unit independently. The pressure in the system may be increased by either increasing the compression of the spring 37 by screwing the bolt 35 upwardly, or by decreasing the compression of the spring 32 by screwing the adjustment 33 downwardly.

The rate of exhausting of the pressure from the brake cylinder 5 may be varied by adjusting the bolt 44 or the threaded member 41. When the bolt 44 is screwed upwardly, the compression of the spring 45' is increased, thus increasing the force required upon the diaphragm 30, to open the valve 26. The same effect may be produced by relaxing the compression of the spring 40 by screwing the threaded member 41 outwardly. When the compression of the spring 45' is relaxed by screwing the bolt inwardly, the pressure required upon the diaphragm 30 to open the exhaust valve is decreased, and the pressure in the system is decreased correspondingly for a given setting of the cam 48.

The exhaust valve and inlet valve regulating units may be conditioned to independently regulate the pressure of the system or to jointly regulate the same. Independent regulation of the pressure by the inlet valve regulating unit may be accomplished by increasing or decreasing the compression of the springs 45' and 40 respectively, to such an extent that the maximum pressure available at the inlet 34 would be insufficient to overcome the valve closing effect of the spring 45'. With this adjustment of the structure, it would be impossible to exhaust the pressure of the system in the manner described above, but the inlet valve 25 could be relied upon to predetermine the pressure in the system, in correspondence with the setting of the cam 47.

The pressure regulating unit of the inlet valve may also be rendered inoperative by increasing the compression of the spring 37, or relaxing the compression of the spring 32 to an extent which would render the maximum pressure at the inlet 49, incapable of closing the inlet valve 25. With this adjustment of the valve structure, the exhaust valve regulating mechanism could be relied upon to maintain the pressure at intensity corresponding to the respective positions of the cam 48 by exhausting some of the air.

Liquid pressures as well as gaseous pressures may be controlled by my improved valve structure which is adapted to control the pressure of fluid systems other than vehicle braking systems.

Although but one specific embodiment of my invention is herein shown and described, it is understood that various changes in the size, shape and arrangement of parts may be made without departing from the spirit of my invention, and it is not intended to limit the scope of my invention other than by the terms of the appended claims.

I claim:

1. In a fluid pressure system, apparatus for controlling the pressure therein comprising a casing having a pressure inlet port and an exhaust port therein, a pair of valves, one in said inlet and one in said exhaust outlet, variable manually operable mechanism comprising yieldable members for opening and closing said inlet and exhaust ports respectively in timed relation to initially build up a pressure in said casing, and a pair of diaphragms, one associated with each of said valves for independently regulating the same by the pressure in said casing.

2. In a pneumatic system, apparatus for controlling the pressure therein comprising a casing having a pressure inlet port and an exhaust outlet port, an inlet and an exhaust valve in said inlet and exhaust ports respectively, pairs of opposed resilient members, one pair urging each of said valves in respectively opposite directions, a pair of pneumatic pressure sensitive devices, one connected with each of said valves for independently regulating the positions of said valves by the pressure in said casing, and means for simultaneously increasing the tension upon the resilient members.

3. In a pneumatic system, apparatus for controlling the pressure therein comprising a casing having a pressure inlet port and an exhaust outlet port, an inlet and an exhaust valve in said inlet and exhaust ports respectively, pairs of opposed resilient members, one pair urging each of said valves in respectively opposite directions, a pair of pressure sensitive devices, one connected with each of said valves for regulating the positions of said valves by the pressure in said casing, and variable manually operable mechanism for varying the force exerted by corresponding resilient members of each pair.

4. The combination with a vehicle having brake shoes thereon, of a fluid pressure system comprising a cylinder, a piston in said cylinder connected with said brake shoes, means in said system for controlling the admission of fluid pressure to said cylinder comprising a casing having an inlet and exhaust ports therein, a pair of valves one in each of said ports, pairs of opposed springs, each pair urging one of said valves in respectively opposite directions, a pair of pressure sensitive members, one connected with each of said valves for independently assisting one of said springs to overcome the force of the other by the pressure in said system, adjustable means for individually predetermining the normal compression of said springs, and mechanism operable by the brake pedal of said vehicle for gradually varying the compression of one spring of each pair to produce gradations of pressure upon said brake shoes.

5. The combination with a vehicle having brake shoes thereon, of a fluid pressure system comprising a cylinder, a piston in said cylinder connected with said brake shoes, means in said system for controlling the admission of fluid pressure to said cylinder comprising a casing having an inlet and exhaust ports therein, a pair of valves one in each of said ports, pairs of opposed springs, each pair urging one of said valves in respectively opposite directions, a pair of pressure sensitive members, one connected with each of said valves for independently assisting one of said springs to overcome the force of the other by the pressure in said system, and mechanism operable by the brake pedal of said vehicle for gradually varying the compression of one spring of each pair to produce gradations of pressure upon said brake shoes.

6. In a vehicle having brake shoes, a fluid pressure system comprising a cylinder and a piston connected with said shoes, an inlet valve in said system, an exhaust valve in said system, a pair of pressure sensitive regulating units, one for each of said valves, and a pair of cams, one associated with each of said regulating units for gradually varying the sensitivity thereof so as to gradually increase and gradually decrease the pressure on said shoes.

7. A control valve mechanism for fluid actuated brakes, comprising a pair of chambers, a pair of diaphragms, one disposed in each chamber, openings in each chamber, a valve disposed in one opening in each chamber and connected to the diaphragms, a relatively strong spring acting upon one of the valves tending to move it to open position and a relatively weak spring acting upon the same valve tending to close it, a corresponding relatively strong spring acting upon the other valve tending to force it to closed position and a relatively weak spring tending to actuate it to the open position, the two valves being so disposed that when pressure is admitted to the chamber one valve is forced to closed position and the other is urged to opened position by reason of the action of the pressure of the diaphragms, and an interconnecting passage between the two chambers.

8. A control valve mechanism for fluid actuated brakes, comprising a pair of chambers, a pair of diaphragms, one disposed in each chamber, openings in each chamber, a valve disposed in each opening and connected to the diaphragms, spring means acting against the diaphragms and respectively urging the valves one to opened position and the other to closed position, conduit means admitting fluid under pressure simultaneously to act against both diaphragms, the pressure on the diaphragms acting against the force of the spring means and manually controlled means for simultaneously varying the tension upon the spring means.

RODOLPHE STAHL.